R. STEWART.
APPARATUS FOR FILTERING LIQUIDS UNDER PRESSURE.

No. 184,024. Patented Nov. 7, 1876.

2 Sheets—Sheet 2.

R. STEWART.

APPARATUS FOR FILTERING LIQUIDS UNDER PRESSURE.

No. 184,024. Patented Nov. 7, 1876.

Witnesses:
L. Atkinson
Jno. H. Manning

Inventor:
Robert Stewart
By R. L. Manson
Atty.

UNITED STATES PATENT OFFICE.

ROBERT STEWART, OF BROOKLYN, NEW YORK.

IMPROVEMENT IN APPARATUS FOR FILTERING LIQUIDS UNDER PRESSURE.

Specification forming part of Letters Patent No. 184,024, dated November 7, 1876; application filed August 8, 1876.

*To all whom it may concern:*

Be it known that I, ROBERT STEWART, of the city of Brooklyn, in the county of Kings and State of New York, have invented certain new and useful Improvements in Apparatus for Filtering Liquids, of which improvements the following is a specification:

This invention relates to that class of apparatus designed for the filtering of liquids under pressure, such apparatus heretofore usually consisting of an air-tight or hermetically-sealed vessel, which is compactly filled with a suitable filtering material, and provided in its interior construction with deflectors and diaphragms for diverting the flow of liquid, also with suitable induction and eduction pipes, and a suitable forcing apparatus, by means of which combination of elements liquids are introduced under great pressure into and forced through the filtering material contained in the vessel, and finally discharged therefrom in a purified condition.

The present invention consists in certain improvements upon the filtering apparatus for which Letters Patent No. 178,972 were granted to me on June 20, 1876. I make use of the adjustable diaphragm, the flexible diaphragm, in the present instance made impermeable, and automatic spring-valve devices, as carefully and fully detailed in said patent, but changing the application of the same, so as to bring the valve arrangements on the exterior of the vessel, and within ready access, for the purpose of such adjustments as may be necessary, all of which, together with full details of construction and operation, will be hereinafter fully pointed out and described.

Figure 1:
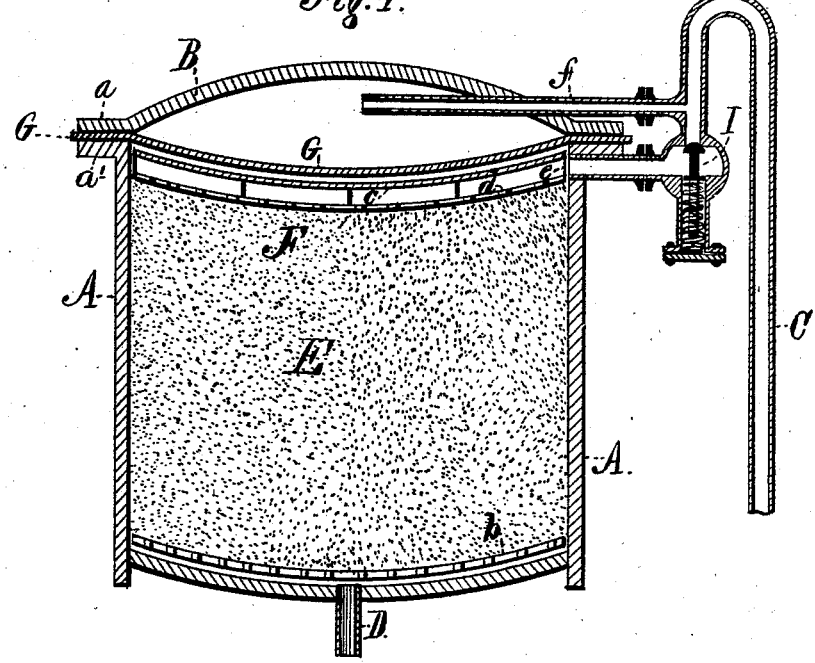
Figure 2:
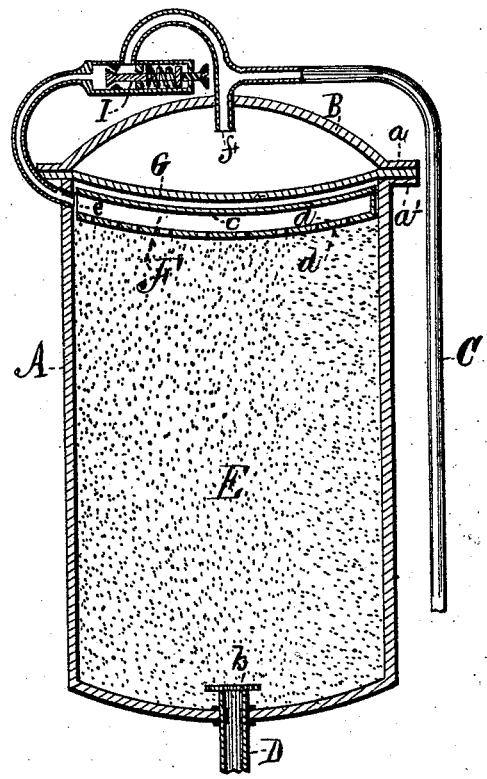
Figure 3:
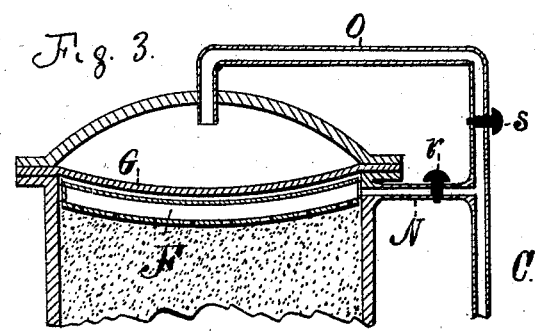

In the drawings, which form an important part of this specification, Figure 1 represents a sectional elevation of an ordinary filtering apparatus, in which is fully embodied my improvements; and Figs. 2 and 3 represent modifications of the same.

The same letters of reference found in the various figures of the drawings will designate corresponding elements and parts.

The construction of the ordinary class of pressure-filters, and the many and vital defects found in their practical use, are well known, and the same is elaborately pointed out in the Letters Patent No. 178,972 issued to me on June 20, 1876.

The following words, quoted from said patent, distinctly and fully pointed out beyond all cavil or doubts the way to cure all the defects named, and also indicated plainly the principles involved in my invention. I stated: "It is to radically cure these defects that I have made my present invention, the main purpose of which is to continually compress the filtering materials by means of the force of the pressure of the liquid as it is introduced into the vessel. I accomplish this by means of a flexible diaphragm, which receives the full pressure of the liquid up to a stated point, the pressure being communicated to an adjustable or movable diaphragm beneath the flexible diaphragm, and resting upon the surface of the filtering material, the pressure exerted upon it preventing the filtering material from getting loose and keeping it in a compact mass. When the pressure reaches a stated point a valve is opened thereby, and permits the fluid to enter the filtering material."

I further stated that "while I prefer the form of apparatus herein shown I shall use, in connection with the flexible and adjustable diaphragms, any system of valves and pressure-gages that will control the pressure and apply it, up to a stated point or degree, to the diaphragms and filtering material before admitting the liquid to the filtering material, and retain such pressure as long as the filter is in operation."

These quotations are made for the purpose of duly emphasizing the prominent points involved in my invention, without regard to the minor details by which the principles so involved are adapted and carried out in practical use. The whole system depends upon the use of flexible diaphragm arranged to receive the pressure of the liquid, the flexible diaphragm resting upon and transmitting its pressure to a movable metallic diaphragm, which, in turn, is forced down upon the surface of the filtering material, holding it compactly in place, and thereby preventing the formation of channels.

It is obvious that, given the flexible diaphragm and the movable diaphragm, both being duly inserted within the filter, as shown in the patent alluded to, many devices for introducing the liquid and applying the pressure to the flexible diaphragm would be readily created by any intelligent mechanic. In the patent granted to me I described two valve devices for such purpose, both being attached to the flexible diaphragm. I found, in practical use, that it was objectionable to have the valve devices inside of the vessel and attached to the flexible diaphragm, as, in case of any derangement of valves, it was a matter of much trouble and labor to remove the cap or cover of the vessel in order to remedy the difficulty. I have, therefore, in my present application, shown the flexible diaphragm as the controlling element alone, and it, in connection with the movable diaphragm below it, is the grand feature of my invention. In the patent granted to me the flexible diaphragm had an opening through its center, to which was attached a valve. In the present case the diaphragm is impermeable, and divides the filtering-vessel into two distinct chambers, the liquid in one chamber never reaching or mingling with that in the other, while in the first-named patent the liquid passed from one chamber to the other. The minor details, by means of which it is made to receive the pressure of the liquid, are simply mechanical devices which may be applied in many ways. I prefer the same system of automatic spring-valves and pressure-gages as shown in my original patent No. 178,972, merely removing them from the flexible diaphragm and applying them to the induction-pipe on the exterior of the vessel.

A represents a vessel capable of resisting great pressure, and constructed of the materials and in the manner usually adopted for such purposes. Although it is shown as cylindrical, yet any other shape or form may be used. B is the cap or cover, curved, as shown, and it may be attached to the top of the vessel by means of a flange, a, the top of the vessel having a corresponding flange, a', the two being securely bolted together in the manner usual in such cases. C is the induction-pipe, attached to the usual forcing apparatus, which, being no part of the present invention, is not shown in the drawings. D is the eduction-pipe, inserted in the base of the vessel, and protected by a covering, b, in the ordinary way. E is the filtering material, such as is used in all filters of this class. F is an adjustable or movable diaphragm. It is constructed of metal, and double in form, its top c being solid, while its base d is foraminated. This double diaphragm fits the vessel closely, and may at its periphery, if so desired, be provided with suitable packing, so as to prevent any liquid from passing between it and the walls of the vessel. It may, at a portion of its periphery, be provided with an opening, e, for the purpose of permitting the entry of the liquid therein; or the upper shell c and the perforated shell d can be united by means of a number of parts, and the entire periphery left open between them. G is a flexible diaphragm, constructed from rubber, corrugated sheet metal, or other suitable elastic material or fabric. It covers the whole top of the vessel, and is secured in its place by insertion between the flanges a and a' of the cover and vessel. It also acts at this point as a packing, preventing the escape of any liquid. The induction-pipe C is carried above on one side or over the top of the vessel, and a branch, f, of the same enters through the cover B into the chamber formed in the vessel between it and the flexible diaphragm G. The main pipe C is continued, and enters the body of the vessel just below the flexible diaphragm G, and opposite the opening e in the double diaphragm F. At a suitable point in the induction-pipe C, and between the branch pipe f and the point where the main pipe enters the body of the vessel, an automatic spring-valve, I, is inserted. It may be of the form as shown in the original patent before alluded to, or of any other form that will accomplish the same purpose. Two arrangements of such valves are shown in Figs. 1 and 2; but, as any similarly-arranged form of spring-valves will fully answer the purpose, a detailed description of their interior construction is not deemed necessary. This valve is arranged to resist a certain amount of pressure, and to be capable of adjustment to a greater or less degree of pressure, as circumstances may demand in different cases.

Having thus fully pointed out the various elements involved in my invention, I will describe the operation of the same. The body of the vessel being first compactly filled with the proper filtering material E, the movable double adjustable diaphragm F is then inserted, resting upon the top of the filtering material, as shown, bringing the opening in its side opposite the induction-pipe C, where it enters the side of the vessel. The flexible diaphragm G is then adjusted in place, resting upon the movable diaphragm F. The cover B is then secured in place, the spring-valve I adjusted to the desired pressure, and the apparatus is ready for use. The liquid to be purified is then forced through the induction-pipe C, and passes by the branch pipe f into the chamber above the flexible diaphragm. When this chamber is filled the pressure is continued, forcing the flexible diaphragm C down upon the movable diaphragm F, which, in turn, is pressed down upon the filtering material. This pressure continues until it reaches that degree at which the valve I is set to open, when the said valve opens, and the surplus liquid above that stated degree of pressure at once flows through the main pipe C and into the vessel below the flexible diaphragm, entering into the interior of the movable diaphragm, and escaping through the perforated base thereof into the filtering material, passing through every part thereof, and finally escaping by means of the eduction-pipe D in the base of the vessel.

It is plainly seen that if the valve I is set to resist a pressure of three hundred pounds to the square inch, that amount of pressure will be exerted upon the flexible diaphragm before the valve opens to permit any liquid to flow into the body of the vessel for filtration, and that the said pressure will continue to be exerted upon the flexible diaphragm so long as the filter is in use, and thence in turn exerted upon the movable diaphragm, and therefrom the filtering material keeping it in a solid compact mass. It is obvious that such continuous pressure will prevent the formation of channels in any part of the filtering material.

I deem it important in carrying out this system that the entire pressure shall be put upon the diaphragm and filtering material before any of the liquid is permitted to enter the body of the vessel, and also that the said pressure shall be continuous and not intermittent.

I do not confine myself to the exact construction of the movable diaphragm F, as herein described, as it may be varied in many ways. It might be single, and still answer the purpose, though I prefer the form as shown.

As a modification of my system, I have shown, in Fig. 2, a device, by means of which pressure may be applied to the flexible diaphragm without the use of any controlling spring valve or valves.

The induction-pipe C has two branches, N and O, branch N entering the body of the vessel below the flexible diaphragm G, and opposite the double diaphragm F, while branch O enters through the cover discharging into the chamber above the flexible diaphragm. Each of these branches have suitable stop-cocks $r$ and $s$. It is apparent that if stop cock $s$ is open, and stop-cock $r$ closed, the liquid forced into the pipe C will pass into the chamber above the flexible diaphragm G, and that the effect will be the same as in the case before described. The cock $s$ is then closed and the pressure thus retained; the cock $r$ may then be opened and the liquid will pass into the body of the vessel for filtration.

Objections exist to this plan, as in case the pressure on the liquid below the flexible diaphragm exceeds that of the liquid above it, the effect is lost at once, and nothing is gained. A system of equalization must be used, and one that will be automatic in itself.

I do not purpose claiming this arrangement of pipes, as I regard it of no practical value.

As another modification, I may mention that two induction-pipes may be used, one connected with a forcing apparatus of great power, and discharging into the chamber above the flexible diaphragm, and the other for introducing the liquid into the body of the vessel, its forcing power being supplied from a separate apparatus from the other, and of less power; or the chamber above the flexible diaphragm may be filled with compressed air, supplied from an air-pump, its power exceeding that of the pump forcing the liquid in all these cases.

My flexible diaphragm and the movable diaphragm must necessarily be used, and, as I regard them as the key of the invention, I do not propose making any detailed claim to all the devices that may be originated for manipulating them.

In some cases it may be found that the diaphragm F may be of a single shell, and that the induction-pipe C may be entered below it and carried to the center of and through the filtering material. Such a construction would perform the work as I have described, and would simply be a modification of my first-described apparatus.

What I claim as my invention is—

1. In an apparatus arranged for filtering liquids under pressure, the combination of the following elements: an air-tight and hermetically-sealed vessel containing filtering material; a suitable forcing apparatus; an induction-pipe provided with an automatic spring-valve, for introducing and controlling the flow of the liquid into the vessel; a fixed impermeable flexible diaphragm dividing the vessel into two chambers; a movable adjustable diaphragm, and an eduction-pipe, the whole arranged and operating substantially as and for the purposes as herein shown and set forth.

2. In combination with an apparatus arranged for filtering liquids under pressure, consisting of the usual air-tight vessel filled with filtering material and the usual induction and eduction pipes for introducing and discharging the liquid, a fixed impermeable flexible diaphragm dividing the vessel into two chambers, arranged and operating as and for the purposes as herein shown and set forth.

3. In combination with an apparatus arranged for filtering liquids under pressure, consisting of the usual air-tight vessel filled with filtering material, the usual induction and eduction pipes for introducing and discharging the liquid; a fixed impermeable flexible diaphragm dividing the vessel into two chambers, and a movable adjustable diaphragm, the whole arranged and operating substantially as and for the purposes as herein shown and set forth.

4. In an apparatus arranged for filtering liquids under pressure, the element of a flexible impermeable diaphragm dividing the filtering-vessel into chambers, one beween the walls of the vessel at the top and the flexible diaphragm, the other between the diaphragm and walls of the vessel, which chamber contains the filtering material, the first-named chamber receiving liquid or air forced therein under one degree of pressure, the last-named receiving the liquid to be filtered at a less degree of pressure, the whole operating as and for the purposes as herein shown and set forth.

5. The combination, in a filter, of the air-tight vessel A, containing filtering material, the induction-pipe C, provided with automatic pressure-valve I and branch pipe $f$, the impermeable flexible diaphragm G, adjustable diaphragm F, either single or double, perforated or not, and the eduction-pipe D, the whole arranged and operating as and for the purposes as herein shown and set forth.

In testimony whereof I have hereunto set my hand this 4th day of August, A. D. 1876.

ROBERT STEWART.

In presence of—
  A. L. MUNSON,
  L. WILKINSON.